United States Patent
Hoecker et al.

(10) Patent No.: US 6,920,756 B2
(45) Date of Patent: Jul. 26, 2005

(54) CHARGED INTERNAL COMBUSTION ENGINE

(75) Inventors: Patric Hoecker, Landau/Pfalz (DE); Stefan Münz, Ludwigshafen (DE); Jens-Wolf Jaisle, Heidelberg (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/455,542

(22) Filed: Jun. 5, 2003

(65) Prior Publication Data

US 2003/0192313 A1 Oct. 16, 2003

Related U.S. Application Data

(62) Division of application No. 09/836,787, filed on Apr. 17, 2001, now abandoned.

(30) Foreign Application Priority Data

May 11, 2000 (DE) .......................................... 100 23 022

(51) Int. Cl.$^7$ ............................ F02B 33/44; F02B 37/04
(52) U.S. Cl. ........................... 60/612; 123/562; 123/565
(58) Field of Search ............................ 60/612; 123/565, 123/562; F02B 37/04

(56) References Cited

U.S. PATENT DOCUMENTS

| | | | | | |
|---|---|---|---|---|---|
| 4,453,381 | A | * | 6/1984 | Dinger | 60/612 |
| 5,063,744 | A | * | 11/1991 | Ishiyama et al. | 60/612 |
| 5,142,866 | A | * | 9/1992 | Yanagihara et al. | 60/612 |
| 6,079,211 | A | * | 6/2000 | Woollenweber et al. | 60/612 |
| 6,182,449 | B1 | * | 2/2001 | Halimi et al. | 60/612 |
| 6,295,817 | B1 | * | 10/2001 | Abthoff et al. | 60/612 |
| 6,378,308 | B1 | * | 4/2002 | Pfluger | 60/612 |

FOREIGN PATENT DOCUMENTS

| | | | | | |
|---|---|---|---|---|---|
| DE | 19708721 | A1 | * | 9/1998 | F02B/37/04 |
| DE | 10144663 | A1 | * | 4/2003 | F02B/37/013 |
| JP | 03194122 | A | * | 8/1991 | F02B/37/04 |

* cited by examiner

*Primary Examiner*—Thai-Ba Trieu
(74) *Attorney, Agent, or Firm*—Bendorf & Cutliff; Greg Dziegielewski

(57) ABSTRACT

A charged internal combustion engine (1) having at least one stage of charging by a turbocharger (3), in which at least one supplemental compressor (4) is connected parallel to or in series with the turbocharger, in which the supplemental compressor (4) has a drive independent form the working medium cycle of the internal combustion engine.

16 Claims, 7 Drawing Sheets

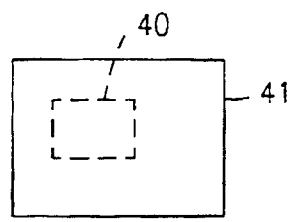
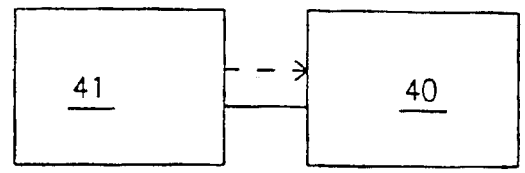
*Fig. 7*  *Fig. 8*
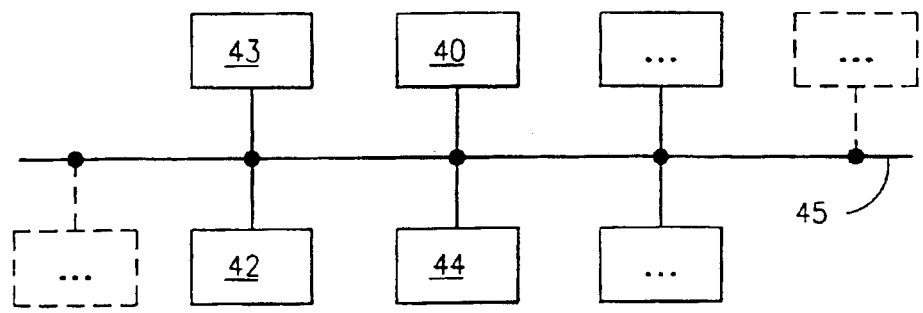
*Fig. 9*
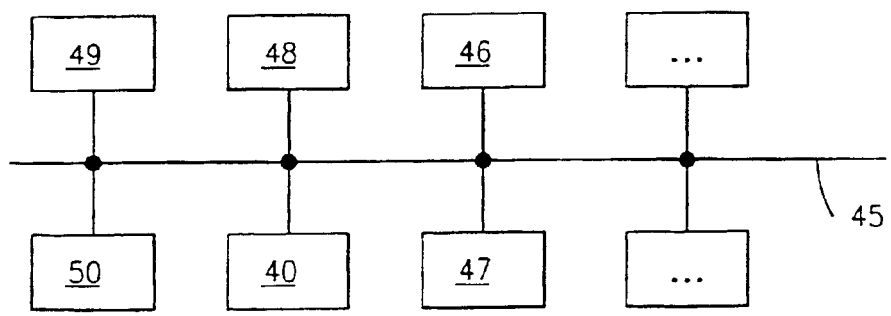
*Fig. 10*

CHARGED INTERNAL COMBUSTION ENGINE

RELATED APPLICATIONS

The present application is a division of U.S. patent application Ser. No. 09/836,787, filed on Apr. 17, 2001, now abandoned, the specification of which is hereby incorporated in its entirety by reference.

BACKGROUND OF THE INVENTION

1. Field of the Invention

The invention refers to a charged internal combustion engine.

2. Description of the Related Art

Internal combustion engines with turbochargers, as commonly known, use the energy contained in the exhaust and convert it into mechanical energy in an exhaust turbine to power a turbo compressor, which increases the pressure of the air supplied to the internal combustion engine. To accomplish this, turbocharging can occur in one or more steps.

In DE 198 37 978 A1, a two step turbocharging is disclosed, where at least two turbines are attached in the exhaust section, each of which power a turbo compressor. The exhaust turbines are connected in series as high and low pressure level. First, the exhaust flows through the high pressure turbine and then through the low pressure turbine. The charge air is first compressed by the low pressure compressor and then by the high pressure compressor and, in certain cases after cooling by passing through a heat exchanger, is supplied to the fresh gas side of the internal combustion engine. As the RPM of the internal combustion engine is increased, compression is increasingly shifted towards a single stage which occurs exclusively in the low pressure compressor. In comparison to one-step compression, charging is already possible at low engine speeds with such a two-step charging process, but the turbine operation, and therefore indirectly the compressor operation, is limited by the energy contained in the exhaust. That means that the unburned gas conducted into the internal combustion engine can only be compressed a little, especially with lower speeds. Without boost the internal combustion engine creates weak torque, which leads to poor acceleration when used in a motor vehicle.

SUMMARY OF THE INVENTION

The invention is concerned with the task of improving an internal combustion engine of the type disclosed in the precharacterizing portion of claim 1, so that it can generate high torque even at low RPM, and thus making stationary torque available more rapidly at partial load. In doing so, a high charge pressure should build up early on, which can match the requirements of the internal combustion engine.

Based on the invention, this task is solved by connecting a supplemental compressor, which has a drive which is independent from the working medium cycle of the internal combustion engine, arranged in parallel or in series with the turbocharger.

In an especially beneficial embodiment, the supplemental compressor is driven by an electric motor, and the supplemental compressor is connected with the turbocharger in series. The supplemental compressor is beneficially arranged upstream of the turbocharger, in front of the turbocharger in the direction of flow.

In a further developed embodiment, a closing or switching means is located between the supplemental compressor and the compressor of the turbocharger. Working with an electronic control device for the electric motor and the closing or switching means and power electronics required to support the electric motor, the supplemental compressor supplements the turbocharger in operational conditions in which the power taken from the exhaust flow is not sufficient or not present.

In a beneficial execution, the supplemental compressor and the compressor of the turbocharger are matched to each other in such a manner, that a comparably wide characteristic diagram or power curve results. The compression ratio of the supplemental compressor and the compression ratio of the turbocharger compressor are multiplied at each operating point.

In a further developed execution, the electric motor is regulated based on the boost pressure output of the turbocharger in relation to the prescribed boost pressure curve, so that the supplemental compressor is switched off when the required boost pressure is reached by the turbocharger. However, a predetermined excess or reserve of the boost pressure may be maintained in unsteady operating phases.

In a special execution, the supplemental compressor and the turbocharger take in air via different intake sections, where the closing-switching means guarantees that the air which is pre-compressed by the supplemental compressor can only flow in the direction of the turbocharger, or when the supplemental compressor of the turbocharger is turned off, cannot conduct air through the supplemental compressor any more. In an advantageous execution of the invention, a charge cooler or heat exchanger is provided between the turbocharger and the internal combustion engine. This decreases the thermal stress of the components on the one hand, and on the other decreases the specific volume of the compressed air which had experienced heating during compression in the supplemental compressor and turbocharger, thus resulting in an increase in specific volume. By cooling and densifying the air, the charged mass of the combustion engine is increased, which results in a considerable increase in power.

Because the power of the supplemental compressor can be operated independently from the internal combustion engine, a further advantage of the invention is that the supplemental compressor also functions as a secondary air pump to conduct the air in the catalytic converter to increase the conversation rate of the catalytic converter in a cold condition.

Through an appropriate design of the turbine, a decrease in the exhaust gas counterpressure is made possible. The execution of the invention is obviously possible with various structural shapes of turbochargers (turbochargers with waste gate or flap or also a charger with variable turbine geometry). The use of multi-stage turbochargers is as conceivable as the use of several supplemental compressors, where the connection could occur not only in series but also in parallel. Several heat exchangers could also be used beneficially. If needed, the supplemental compressor and the turbocharger can intake from the same intake section. A possible bypass with a switch means makes it possible to detour the exhaust gas side of the turbocharger. In order to reduce the amount of nitrogen oxide emission through the exhausts coming from the internal combustion engine, an exhaust gas recirculation system (EGR) can be used, which draws in an amount of exhaust gas from a engine exhaust conduit to a point upstream from the turbine of the turbocharger, and conducts it into an engine intake conduit (DE 41 20 055 A1).

In an especially beneficial execution of the invention, the supplemental compressor can be incorporated in an assembly of the internal combustion engine. In doing so it is possible to either incorporate only the supplemental compressor into the assembly or also additional components or aggregates, such as the switching and/or closing means in front of and behind the supplemental compressor, if necessary, required throttle means or even the drive for the supplemental compressor. When putting the supplemental compressor in the intake pipe assembly, it is beneficial to integrate the supplemental compressor in the intake pipe or to build it onto the intake pipe. In a further developed execution, the spiral guide around the compressor wheel can be directly formed on the intake pipe. When mounting the supplemental compressor drive at the intake pipe (or at the internal combustion engine or the body), it is beneficial to provide a vibration decoupling fastener in order to mitigate the vibration loads of the internal combustion engine's stimulus.

In another beneficial execution of the invention, the cylinder head assembly contains the supplemental compressor. For this, the supplemental compressor can be integrated or mounted in the cylinder head or in the cylinder head cover. Formation of the spiral guide around the compressor wheel is possible directly on the cylinder head. When mounting the supplemental compressor drive at the cylinder head, vibration decoupling is beneficially executed.

Other beneficial executions of the invention provide for integration or building on the supplemental compressor in/at the air filter casing or also in/at the exhaust train. Here also, in a further developed execution, the spiral guide around the compressor wheel is formed directly at the air filter casing or in the exhaust train, and the supplemental compressor drive is mounted with vibration decoupling. In a further developed execution of the invention, when arranging the components in the exhaust, these are thermally decoupled, i.e. connecting using a flange with minimal heat conducting capabilities or shielding using a heat shield to minimize the temperature stress on the components.

It is beneficial to connect the heat produced by the drive using a coolant circuit corresponding with the supplemental compressor drive to cool the supplemental compressor drive when necessary.

In an especially beneficial execution of the invention, the switching/closing/or throttle means located in front of or behind the supplemental compressor could also be integrated or built into the following components: intake pipe pipe/cylinder head cover/air filter casing/exhaust train. In a further developed execution—if the supplemental compressor is used as a secondary air pump—the secondary air conduit can also be integrated into or mounted into the mentioned components. The same is possible for the exhaust gas recirculation conduit and the engine ventilation. In the same way, it is possible to integrate the on board diagnostic (OBD) monitor and the sensors in the same assemblies. The turbocharger compressor can also be integrated or build into the components in an especially preferred execution.

A very compact and cost-effective construction is achieved with the mentioned executions where the supplemental compressor is integrated in the assemblies of the internal combustion engine, so that, for example, when used in motor vehicles, the supplemental compressor barely requires additional space compared to the conventional internal combustion engines. Because especially short pipes (air, gas and coolant pipes) are used with these integral constructions, waste and leak risks are minimized.

In an especially beneficial execution, the invention includes control of the supplemental compressor. In a first execution, this control is integrated into the internal combustion engine's control. In a further developed form of the invention, the electronic control of the supplemental compressor is separate from the internal combustion engine's control, where especially advantageous parameters of the engine performance conditions represent an input quantity of the control electronics.

In another beneficial execution of the invention, the internal combustion engine's control is split into partial or subcomponent systems, wherein the control of the supplemental compressor is connected to the entire system as a partial system. The individual partial systems communicate with each other using a bus system (CAN-Bus). Benefits of this subdivision are the simple monitoring and programming of the partial system.

In an especially beneficial execution of the invention, the vehicle's entire system is split into partial systems (system islands). The control of the supplemental compressor is incorporated in such a partial system; the partial systems communicate with each other using a bus system (CAN-Bus). An advantage of this execution is the possibility to match the individual systems with each other optimally, so that the primary goal is optimally adjusting the fuel consumption for the power output as currently or instantaneously necessary for the internal combustion engine. Additional advantages are the simple monitoring and programming of the partial systems and the possibility to add additional components of control without great effort.

BRIEF DESCRIPTION OF THE DRAWINGS

Preferred executions of the invention are explained in references to the attached drawings. They show in:

FIG. 7 a schematic of a control for the supplemental compressor integrated into the engine control.

FIG. 8 a schematic of a control for the supplemental compressor separate from the engine control.

FIG. 9 a schematic of an engine control split into partial systems, including the control of the supplemental compressor as a partial system.

FIG. 10 a schematic of a vehicle entire system split into partial systems, including the control of the supplemental compressor as a partial system.

DETAILED DESCRIPTION OF THE INVENTION

Figure 1:
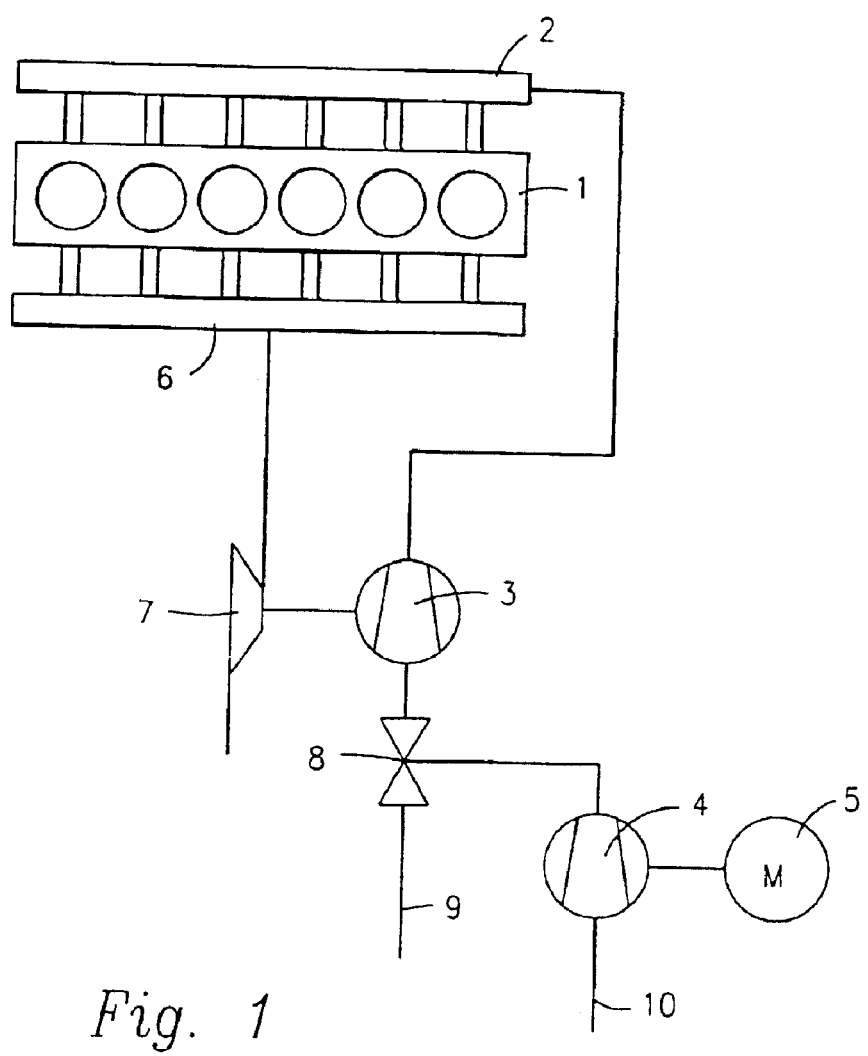
FIG. 1 a schematic representation of an internal combustion engine with one-step turbocharging and an supplemental compressor powered by an electric motor in a first execution based on the invention.

FIG. 1 shows an internal combustion engine 1, which on the fresh gas side 2 is connected to the compressor of a turbocharger 3 and a supplemental compressor 4. The supplemental compressor 4 is connected to the turbocharger compressor 3 in series, and arranged, in the flow direction, in front of the turbocharger compressor 3. The supplemental compressor 4 is powered by an electric motor 5. The turbine 7 of the turbocharger is connected to the internal combustion engine 1 on the exhaust side 6. A closing or switching means 8 is arranged between the supplemental compressor 4 and the turbocharger compressor 3. Using the switch means 8, the turbocharger compressor 3 can draw from its own intake area 9 as well as from the supplemental compressor 4. The supplemental compressor 4 draws from the intake area 10. If necessary, two air mass measurers or meters as well as two filters are provided.

Figure 2:
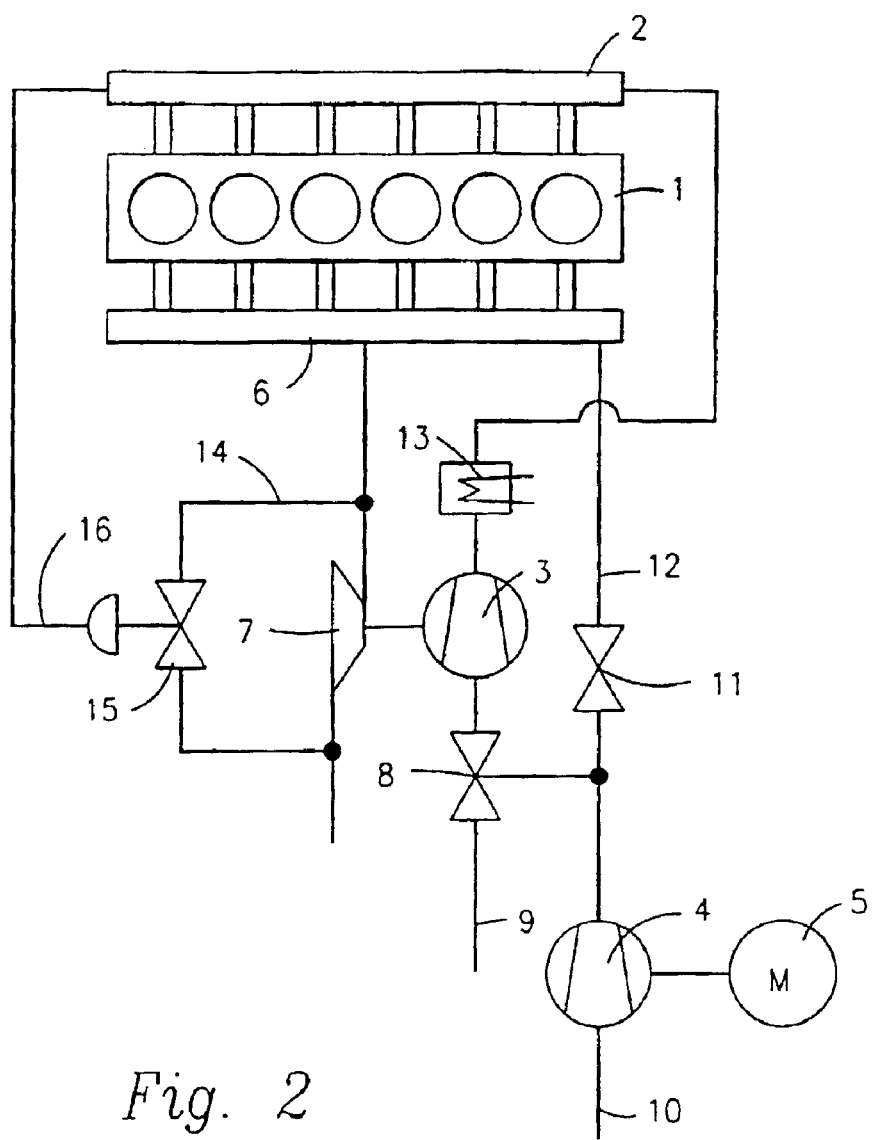
FIG. 2 a schematic of an internal combustion engine with simple turbocharging and supplemental compressor with secondary air channel, turbine bypass and exhaust return.

FIG. 2 shows an internal combustion engine with simple turbocharging and an electrically powered supplemental compressor, where the main design corresponds with FIG. 1. A closing means 11 is arranged in flow direction behind the supplemental compressor 4, parallel to the closing or switching means 8, with which the mass flow in the secondary air channel 12 can be controlled. A charge cooler 13 is arranged in flow direction behind the turbocharger compressor 3, which cools the fresh compressed gas before entry into the internal combustion engine 1. Operation without turbocharging is possible with a bypass 14, which diverts exhaust gas to the exhaust side of the turbine 7 of the turbocharger. The switching means 15 controls the mass flow, which is conducted on the fresh gas side using the exhaust return 16.

Figure 3:
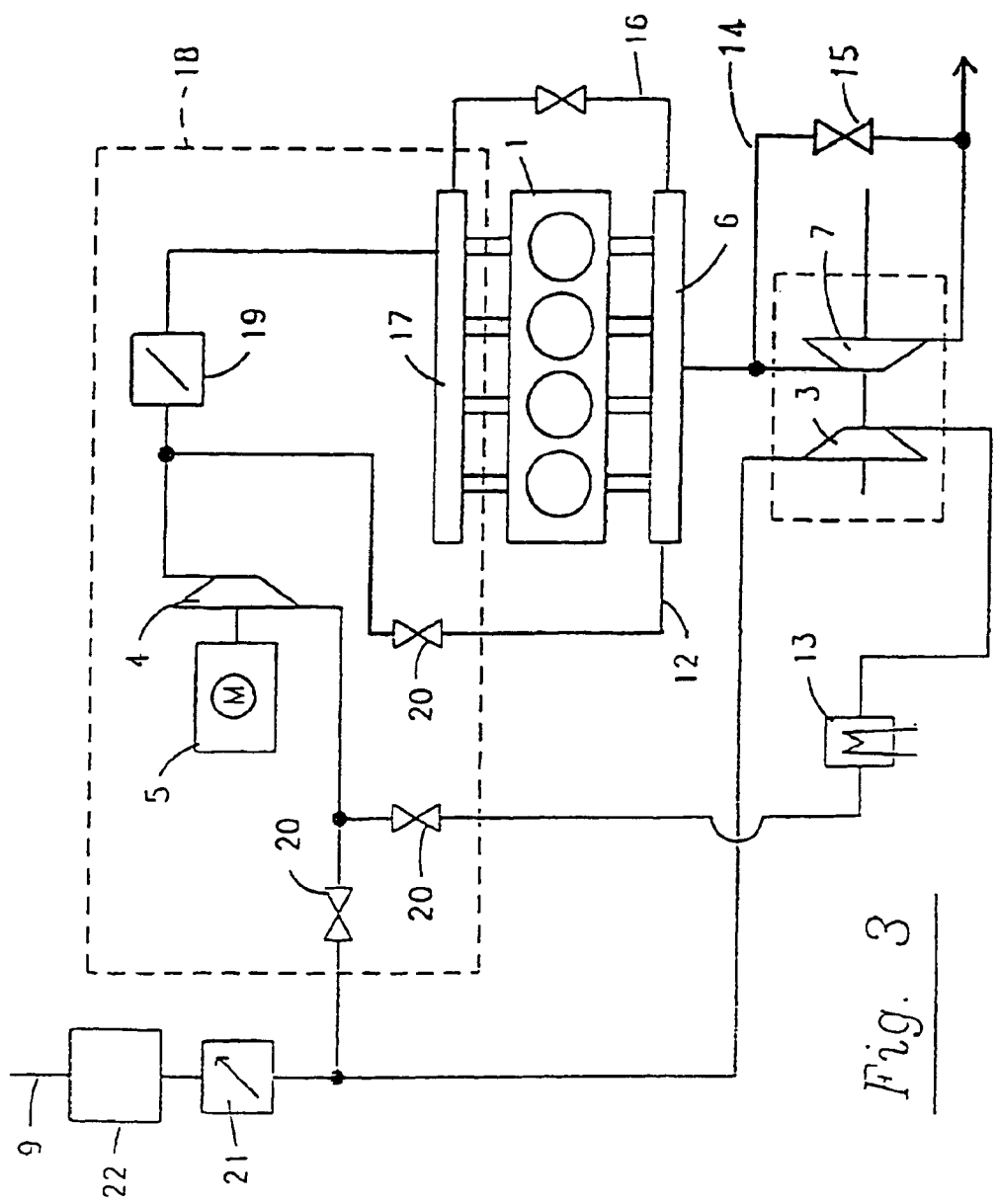
FIG. 3 a schematic of an internal combustion engine with simple turbocharging and supplemental compressor with secondary air channel, turbine bypass and exhaust return, with the supplemental compressor integrated into the intake pipe assembly.

FIG. 3 shows an internal combustion engine with all components from FIG. 2. In this execution, the intake pipe assembly 18 includes the intake pipe 17, a throttle valve 19 and a supplemental compressor 4, arranged sequentially going in the upstream direction. In addition, drive 5 of the supplemental compressor 4 and the switching or throttling means 20 are arranged in front of and behind the supplemental compressor 4 in the intake pipe assembly 18. Supplemental compressor 4 and turbocharger compressor 3 draw raw air from the same intake area 9, in which the air mass meter 21 and air filter 22 are connected.

Figure 4:
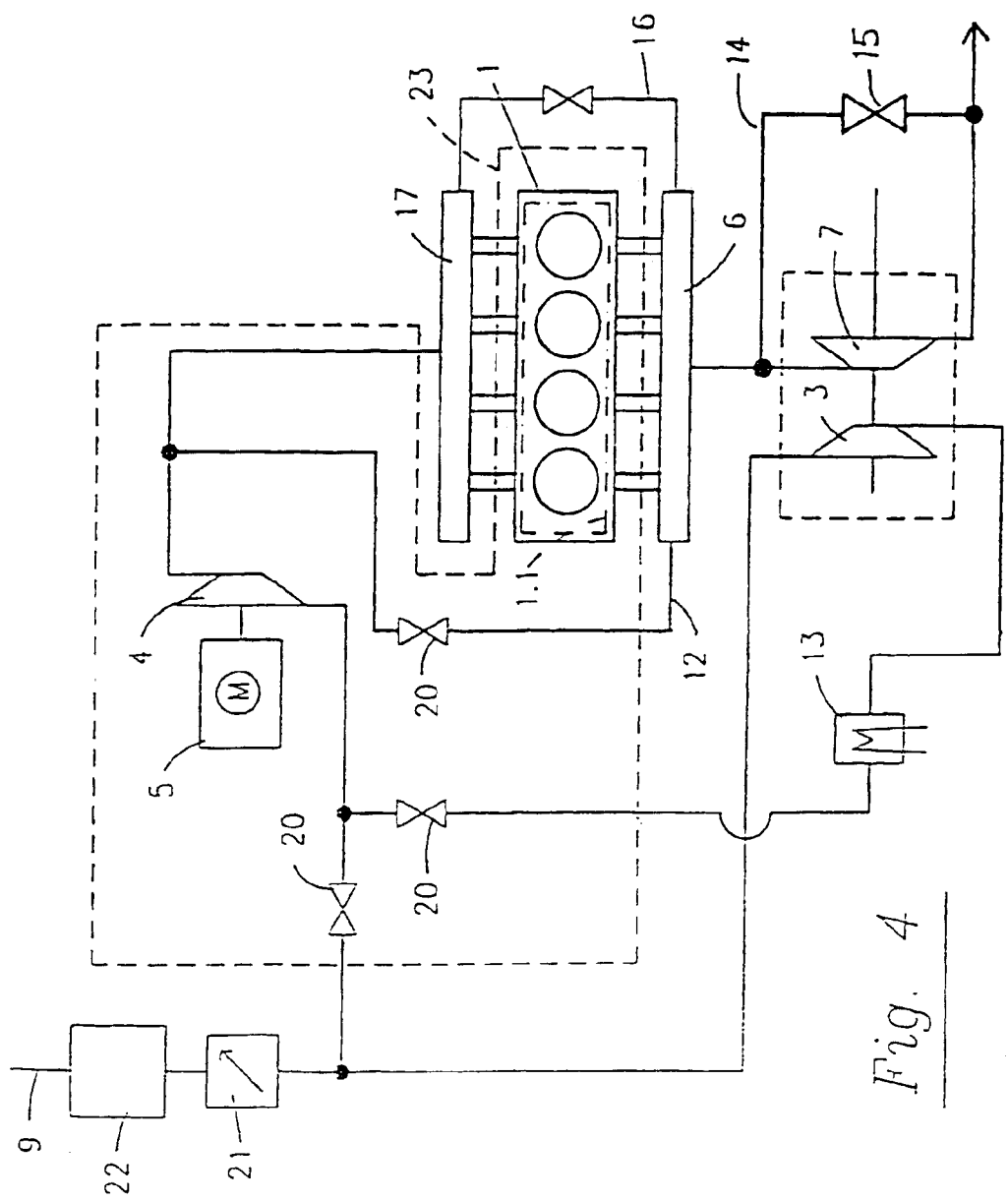
FIG. 4 a schematic of an internal combustion engine with simple turbocharging and supplemental compressor with secondary air channel, turbine bypass and exhaust return, with the supplemental compressor integrated into the cylinder head assembly.

FIG. 4 shows the schematic of an internal combustion engine in which the cylinder head assembly 23 includes the supplemental compressor 4, its drive 5 and the closing or switching means. Integrating the supplemental compressor 4 and mounting the drive 5 in the or at the cylinder head cover 1.1 is beneficial.

Figure 5:
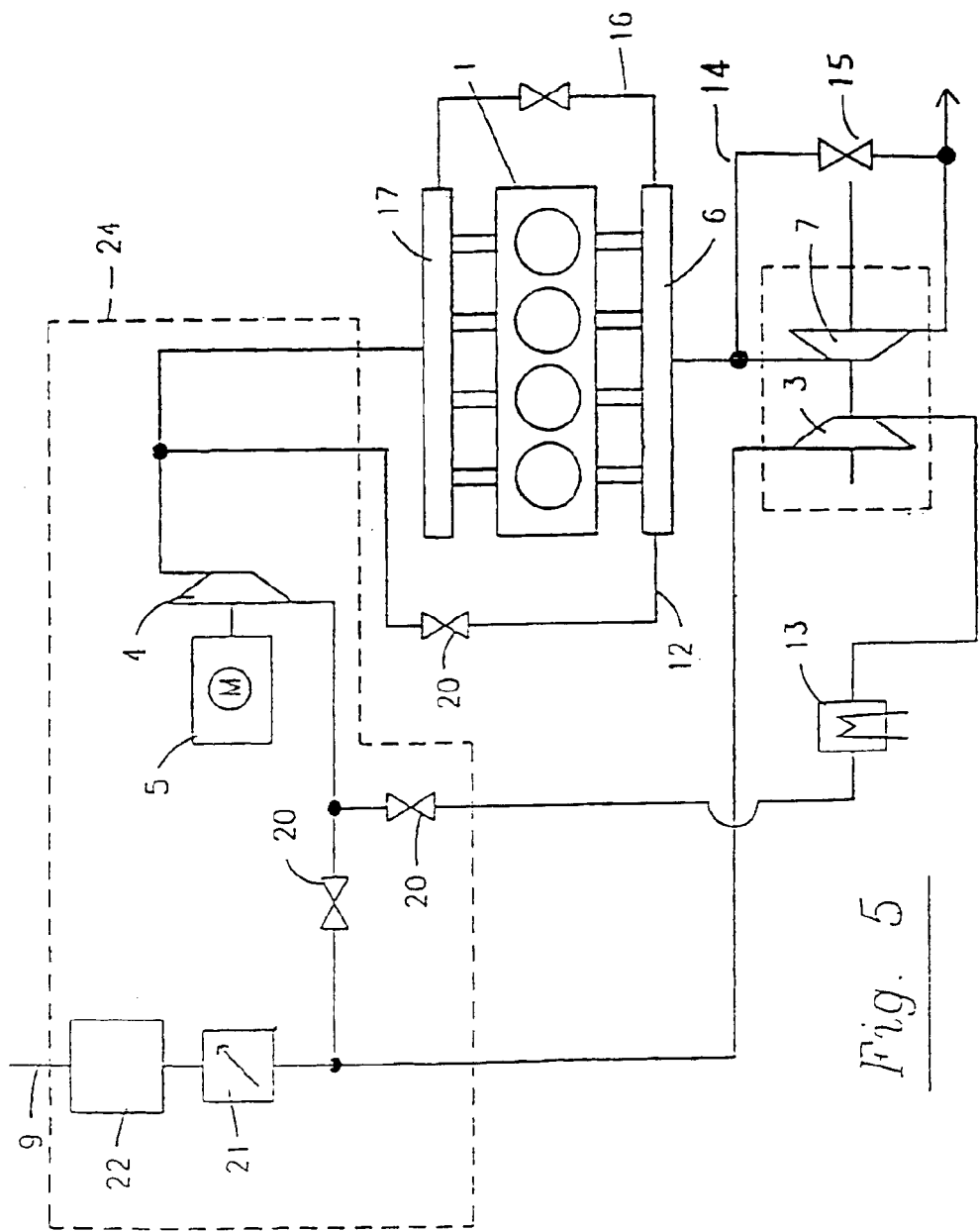
FIG. 5 a schematic of an internal combustion engine with simple turbocharging and supplemental compressor with secondary air channel, turbine bypass and exhaust return, with the supplemental compressor integrated into the air filter casing assembly.

FIG. 5 shows the schematic of an internal combustion engine, in which the air filter casing assembly 24 incorporates the supplemental compressor, its drive 5, the closing or switching means 20 which are arranged in front of the supplemental compressor 4 in flow direction, the air mass measurer 21 and the air filter 22.

Figure 6:
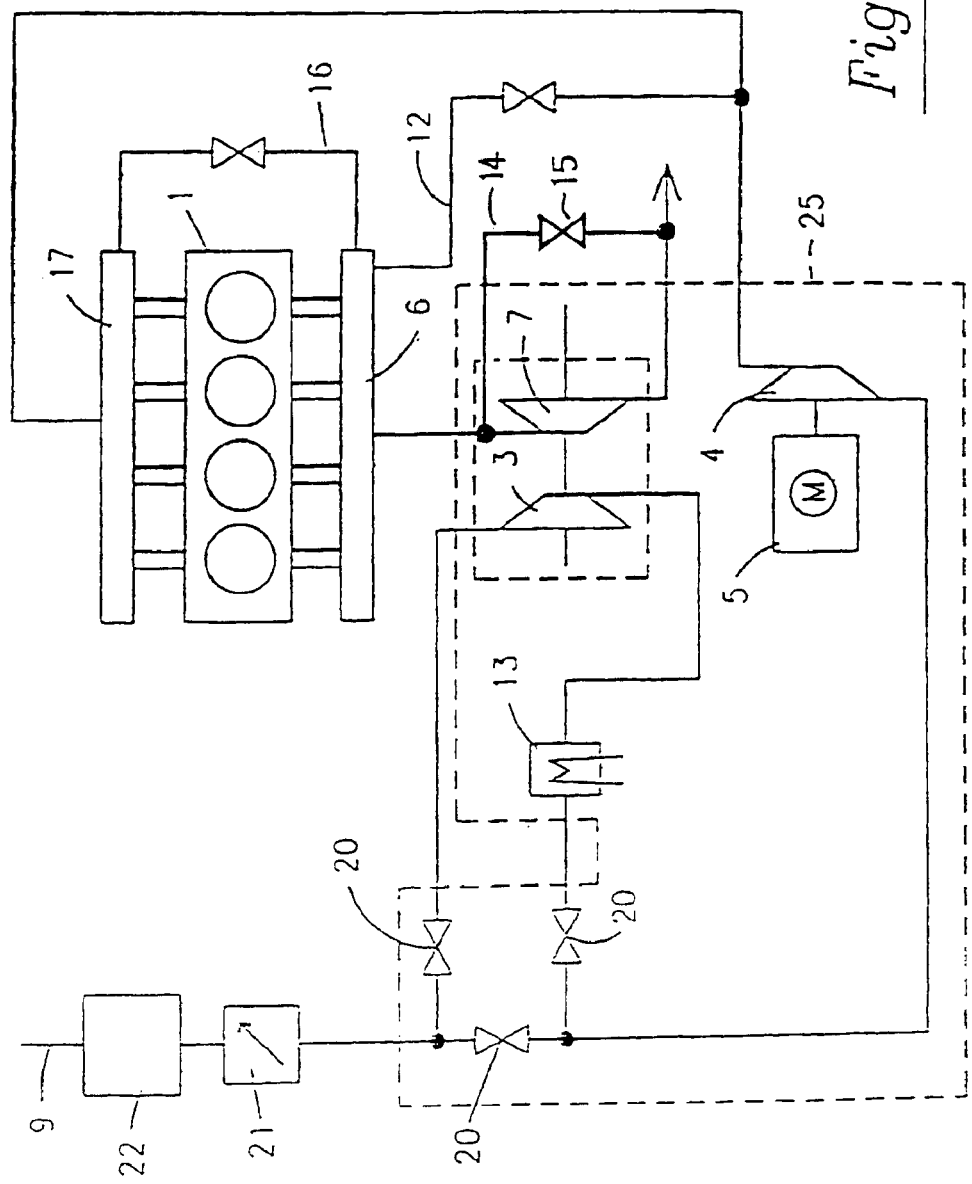
FIG. 6 a schematic of an internal combustion engine with simple turbocharging and supplemental compressor with secondary air channel, turbine bypass and exhaust return, with the supplemental compressor integrated into the exhaust train assembly.

FIG. 6 shows the schematic of an internal combustion engine, in which the exhaust train assembly 25 incorporates the supplemental compressor 4, its drive 5, compressor 3 and turbine 7 of the turbocharger, the charge cooler 13 and the closing or switching means 20.

FIG. 7 shows the schematic of an internal combustion engine, in which the control 40 of the supplemental compressor is integrated into the-engine control 41.

FIG. 8 shows an internal combustion engine with a control 40 of the supplemental compressor which is separately executed from the engine control 41, where the parameters of the engine operational condition are input quality of the control electronics of the supplemental compressor.

FIG. 9 shows the schematic of an engine control split into partial systems, where, for example, the partial system of control 40 of the supplemental compressor, the control of the partial system 42 of the intake pipe, of the partial system 43 of the injection and the partial system 44 of the air filter are represented. Additional partial systems are indicated. The partial systems communicate with each other using the bus system 45 (CAN-bus).

FIG. 10 shows the schematic of a vehicle entire system split into partial systems, where, for example the partial system 40 of the control of the supplemental compressor, the partial system 46 (drive train), the partial system 47 (ABS), the partial system 48 (chassis), the partial system 49 (passenger compartment) and the partial system 50 for heating are represented. The partial systems communicate with each other using the bus system 45 (CAN-bus).

REFERENCE NUMBER LIST 1 internal combustion engine
2 fresh gas side
3 turbocharger compressor
4 supplemental compressor
5 electric motor
6 exhaust gas side
7 turbine
8 switch means
9 intake area
10 intake area
11 closing means
12 secondary air channels
13 charge cooler
14 bypass
15 adjusting means
16 exhaust return
17 intake pipe
18 intake pipe assembly
19 throttle valve
20 switching means
21 air mass measurer
22 air filter
23 cylinder head assembly
24 air filter casing assembly
25 exhaust train assembly
40 controller
41 engine control
42 partial system for the intake pipe
43 partial system for the injection
44 partial system for the air filter
45 bus system
46 partial system for the drive train
47 ABS
48 partial system for the chassis
49 partial system for the passenger compartment
50 partial system for the heating

What is claimed is:

1. A charged internal combustion engine (1) including:

(a) at least one stage of charging by a turbocharger (3);

(b) at least one supplemental compressor (4) connected to the turbocharger;

(c) a heat exchanger (13) arranged downstream of the turbocharger;

(d) an electric motor (5) drive for the supplemental compressor (4); and (e) at least one closing or switching means (11) provided between the supplemental compressor (4) and the turbocharger, wherein the internal combustion engine (1) includes a control means for the control of the supplemental compressor.

2. The charged internal combustion engine (1) of claim 1, wherein an electronic control device (40) is present to regulate operation of the supplemental compressor (4) and the closing or switching means (8, 11).

3. The charged internal combustion engine (1) of claim 2, wherein the control of the supplemental compressor (4) is a subsystem in the central internal combustion engine control (41).

4. The charged internal combustion engine (1) of claim 3, wherein, wherein the partial systems are connected to each other with a bus system (45).

5. The charged internal combustion engine (1) of claim 1, wherein the control means for the supplemental compressor (40) is separate from the internal combustion engine control (41).

6. The charged internal combustion engine (1) as in claim 5, wherein the parameters monitored as to the engine operational condition provide an input value for the control electronics.

7. The charged internal combustion engine of claim 1, wherein the control (40) of the supplemental compressor (4) is a subsystem of the vehicle system.

8. The charged internal combustion engine (1) as in claim 7, wherein the partial systems are connected to each other with a bus system (45).

9. A charged internal combustion engine (1) including:

(a) at least one stage of charging by a turbocharger (3);

(b) at least one supplemental compressor (4) connected to the turbocharger;

(c) a heat exchanger (13) arranged downstream of the supplemental compressor;

(d) an electric motor drive (5) for the supplemental compressor (4); and (e) at least one closing or switching means (8, 11) provided between the supplemental compressor (4) and the turbocharger (3), wherein an electronic control device (40) is present to regulate operation of the supplemental compressor (4) and the closing or switching means (8, 11).

10. The charged internal combustion engine (1) of claim 9, wherein the control (40) of the supplemental compressor (4) is a subsystem in the central internal combustion engine control (41).

11. The charged internal combustion engine (1) of claim 10, wherein the partial systems are connected to each other with a bus system (45).

12. The charged internal combustion engine (1) of claim 9, wherein the control means (40) for the supplemental compressor (4) is separate from the internal combustion engine control (41).

13. The charged internal combustion engine (1) as in claim 12, wherein the parameters monitored as to the engine operational condition provide an input value for the control electronics.

14. The charged internal combustion engine of claim 9, wherein the control (40) of the supplemental compressor (4) is a subsystem of the vehicle system.

15. The charged internal combustion engine as in claim 14, wherein the partial systems are connected to each other with a bus system (45).

16. A charged internal combustion engine (1) including:

(a) at least one stage of charging by a turbocharger (3);

(b) at least one supplemental compressor (4) connected to the turbocharger;

(c) an electric motor drive (5) for the supplemental compressor; and (d) at least one closing (11) or switching (8) means provided between the supplemental compressor (4) and the turbocharger, wherein an electronic control device (40) is present to regulate operation of the supplemental compressor (4) and the closing (11) or switching (8) means, and wherein at least one supplemental compressor (4) with at least one compression stage is connected in parallel with the turbocharger.

\* \* \* \* \*